Sept. 28, 1965          J. D. HARMS ETAL          3,208,205
MULTI-LAYER FILTER ARRANGEMENT
Filed June 6, 1962          2 Sheets-Sheet 1
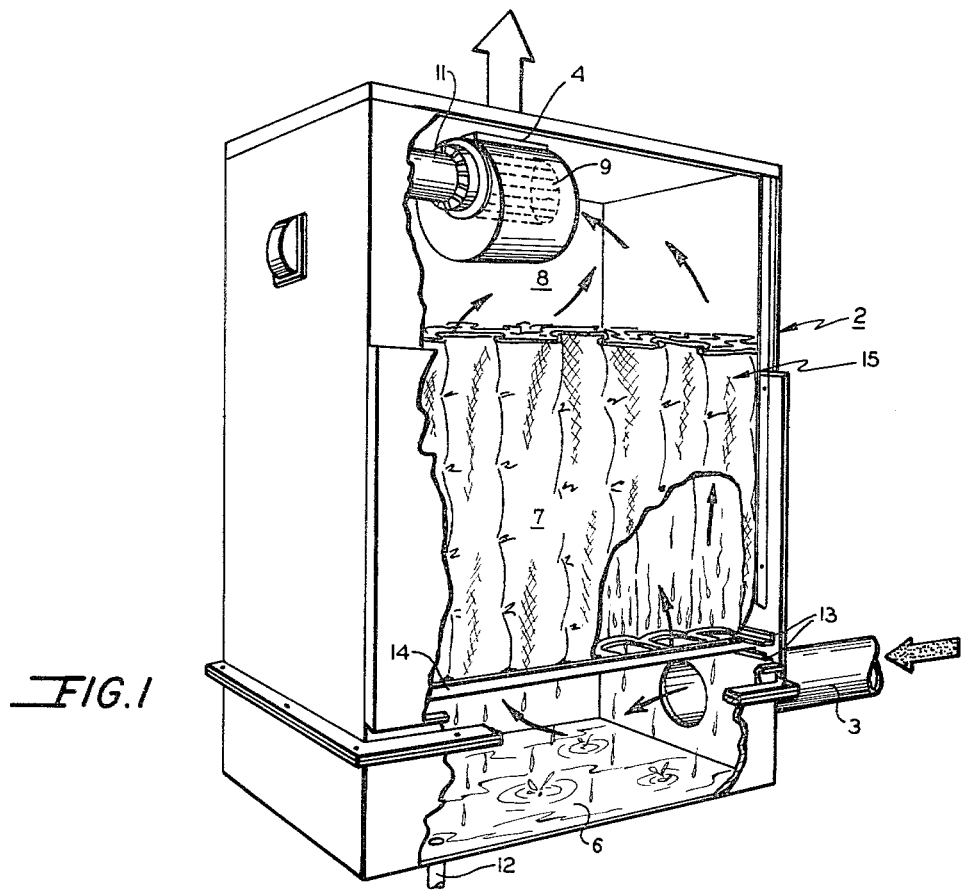
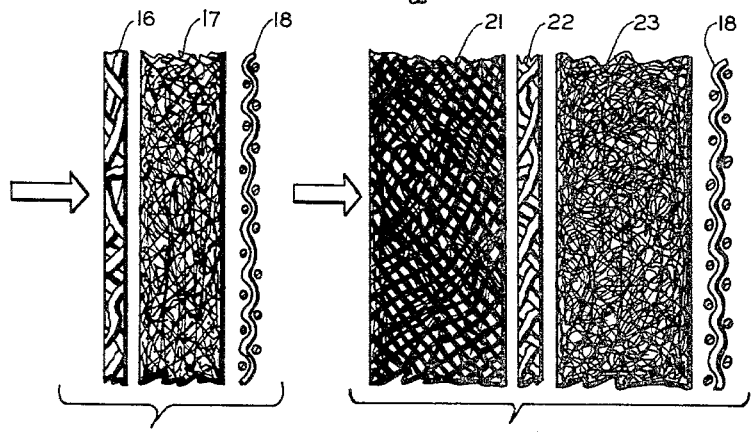
INVENTORS
JOHN D. HARMS
KARL L. WESTLIN
BY
Ralph B. Brick
ATTORNEY Sept. 28, 1965         J. D. HARMS ETAL         3,208,205
              MULTI-LAYER FILTER ARRANGEMENT
Filed June 6, 1962                              2 Sheets-Sheet 2

INVENTOR.

BY   JOHN D. HARMS
     KARL L. WESTLIN

United States Patent Office 3,208,205
Patented Sept. 28, 1965

3,208,205
MULTI-LAYER FILTER ARRANGEMENT
John D. Harms, Valley Station, and Karl L. Westlin, Louisville, Ky., assignors to American Air Filter Company, Inc., Louisville, Ky., a corporation of Delaware
Filed June 6, 1962, Ser. No. 200,539
1 Claim. (Cl. 55—472)

The present invention relates to fluid filters and more particularly to high efficiency multi-layer gas filters capable of removing solid and liquid contaminants from gaseous streams.

In accordance with the present invention an improved, highly efficient filter arrangement is provided which economically removes both solid and liquid contaminants from a gaseous stream in a continuous manner, the improved arrangement being compact and light in weight. Further, the present invention provides a filter arrangement which affords large collection capacity, presenting a minimum of resistance to the gas stream treated and permitting ready removal and replacement of filter media included in the arrangement.

Various other features of the present invention will become obvious to one skilled in the art upon reading the disclosure set forth herein.

More particularly, the present invention provides apparatus for separating both solid and liquid contaminants from a dirty gas stream comprising: upstream and downstream layers of flexible filter media positioned in faced, vertical relationship with respect to each other to provide a vertically extending interface therebetween and arranged as a unit to form a vertically extending pocket member through which the dirty gas stream is passed; one of the layers of filter media comprising a bed of finely divided, low density fibrous material having spaced inlet and outlet faces with the fibers interspersed therebetween to form a maze of indeterminate liquid drain channels communicably connected to the interface whereby liquid contaminants separated by the filter media can drain by gravity to a point outside the gas stream being treated. In addition, the present invention provides an arrangement wherein the bed of finely divided low density fibrous material can be positioned intermediate upstream and downstream layers of filter media to provide upstream and downstream interfaces for more efficient filtering operations.

It is to be understood that various changes can be made in the arrangement, form and construction of the apparatus disclosed herein without departing from the scope or spirit of the present invention.

Referring to the drawing:

FIGURE 1 is a partially broken away perspective view of an advantageous embodiment of the inventive apparatus;

FIGURE 2 is an exploded and enlarged cross-sectional view of one inventive multi-layer filter media which can be incorporated as part of the apparatus of FIGURE 1;

FIGURE 3 is a similarly exploded and enlarged cross-sectional view of another inventive multi-layer filter media which also can be incorporated as part of the apparatus of FIGURE 1, and, FIGURE 4 is an enlarged, perspective view of a portion of the apparatus of FIGURE 1, disclosing details of the filter media support arrangement.

Figure 4:
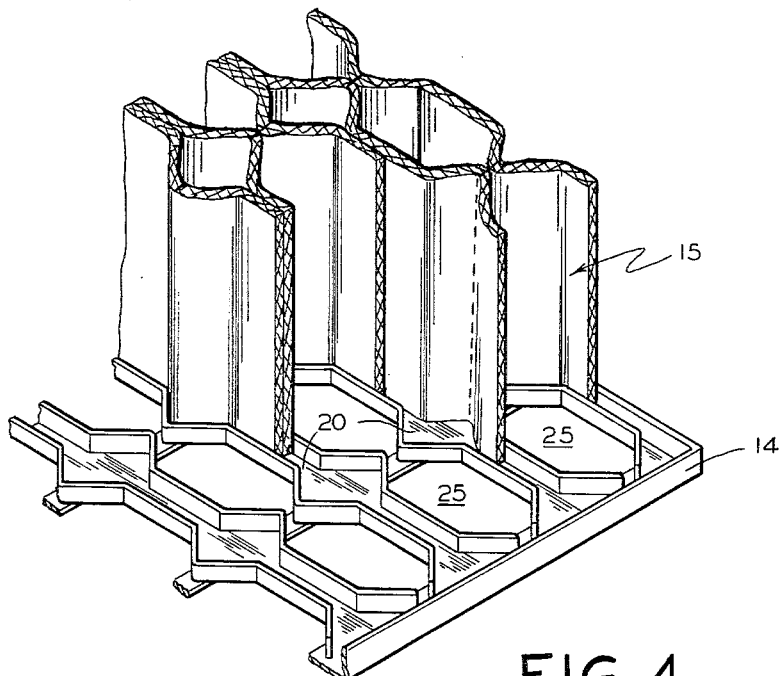

As can be seen in FIGURE 1, housing 2 adapted for an upflow system is disclosed, the housing including dirty gas inlet 3 in the lower portion thereof and clean gas outlet 4 at the top portion thereof. It is to be noted that the present invention is not to be considered as limited to the upflow system described in detail hereinafter. If desired, a suitable downflow arrangement incorporating features of the present invention can be constructed.

Housing 2 is broadly divided into three sections—namely, dirty gas plenum section 6 which communicates with dirty gas inlet 3, gas treating plenum section 7 adjacent to and communicating with dirty gas inlet plenum 6, and clean gas plenum section 8 communicating with and downstream gas treating plenum section 7. A suitably selected scroll fan 9 is mounted on the roof of housing 2 in clean gas plenum section 8 in communication with clean gas outlet 4. Scroll fan 9 receives its power from motor 11 connected thereto, the fan serving to draw a gas stream to be treated into the dirty gas plenum section, through the gas treating section and out the gas outlet 4. It is to be noted that suitable drain outlet 12 is provided at the bottom of housing 2 to communicate with dirty gas plenum section 6 to permit drainage of liquid contaminants which are filtered from the gas stream in a manner described hereinafter.

Mounted on each of the opposite vertically extending side walls of housing 2 adjacent the entrance of gas treating plenum section 7 is a set of spaced guide rails 13, guide rail set 13 serving to receive in sliding manner support member 14 of filter media cartridge 15. It is to be understood that filter media cartridge 15, which incorporates features of the present invention, can be arranged in any one of several pocket-type filter forms. Advantageously, the cartridge is arranged in a filter pocket form similar to that disclosed in assignee's co-pending application Serial No. 104,200, filed April 17, 1961 in the name of Richard D. Rivers, now Patent Number 3,124,441 granted March 10, 1964. As such, the filter media is arranged in pleat form, each pleat having spaced seams to form a multiplicity of pocket members having mouth portions at one end thereof. The support member 14 includes spaced bars 20 having depending sides and being contoured to present a plurality of successive opposed crests and valleys to define apertures 25, the bars 20 cooperating with the mouth portions of the pocket members to displace the media adjacent such mouth portions and maintain the mouths in open position to receive through apertures 25 the dirty gas stream to be treated.

In accordance with the present invention, filter cartridge 15 is composed of vertically extending layers of flexible filter media positioned in faced relationship to each other to provide vertically extending interfaces therebetween,. As disclosed in FIGURE 2 of the drawing, filter cartridge 15 can be comprised of an upstream layer of vertically extending filter material 16 and a downstream layer of vertically extending filter material 17 arranged to face the upstream layer so as to form a vertically extending interface therebetwen. A suitable scrim backing material 18 can be provided adjacent the downstream side of downstream layer 17. The upstream layer of filter material 16 is comprised of a bed of low density fibrous material having spaced inlet and outlet faces with the fibers interspersed and interconnected therebetween to form a maze of indeterminate liquid drain channels. These drain channels communicably connect with the vertically extending interface that is formed between the layers of filter media 16 and 17 in such a manner as to make substantially point contacts at a multiplicity of places along the interface. Liquid contaminants separated by the filter media layers in the course of filtering operations then can drain by gravity from the interface along the channels to the dirty gas plenum 6 and out through drain outlet 12. Advantageously, the fibers of upstream layer 16 are of odorless, acid resistant glass with that side of filter layer 16 which is adjacent filter layer 17 and which forms an interface therewith being of slightly fuzzy nature so as to permit the point contacts but not so fuzzy as to cause fiber separation or create media instability. It is to be noted that it is important that the diameter of the fibers in filter layer 16 be of sufficient size to avoid the problem of matting and the concomitant problems of passage choking and surface tension which would inhibit proper drainage of the liquid contaminants and thus defeat the purpose of the filter layer. Advantageously, it has been found that the fibers in filter layer 16 can be in a diameter range of approximately 10 microns to approximately 50 microns and that the interspersed fibers can be interconnected by a suitable binder, such as starch, distributed throughout the layer.

As to the downstream filter layer 17, the fibers of this layer also advantageously can be of glass but of much finer diameter than the diameter of the fibers of the upstream filter layer 16. Advantageously, it has been found desirable that these fibers be in a diameter range of approximately .2 micron to approximately 1.0 micron. Since filter layer 17 has a fiber diameter much finer than that of the upstream filter layer 16, liquid contaminants filtered out by filter layer 17 flow to the interface and drain through the indeterminate liquid drain channels of filter layer 16.

It should be noted that at least one of the layers of filter media advantageously can be of sufficient rigidity to maintain the pocket members in vertically extended postion. It also should be noted—once again—that the present invention should not be considered as limited to the particular upflow arrangement of FIGURE 1 where such rigidity would be desirable. In fact, if desired, a downflow system can be provided including a dirty gas inlet at the top of housing 2, a clean gas outlet at the bottom of the housing and a filter cartridge 15 suspended from the upper portion of the housing between such inlet and outlet.

Referring to FIGURE 3 of the drawing, a modified filter media arrangement for filter cartridge 15 is disclosed. This arrangment includes an upstream layer of vertically extending flexible filter medium 21 and a downstream layer of vertically extending flexible filter medium 23, the layers of filter media being so positioned in faced relationship with respect to each other as to provide a pair of vertically extending interfaces therebetween. In this embodiment of the invention, the intermediate layer of filter medium 22 can be like the upstream layer 16 of the embodiment of the invention disclosed in FIGURE 2. As such, it comprises a bed of finely divided, low density fibrous material having spaced inlet and outlet faces with the fibers therebetween interspersed and of sufficient diameter to form a maze of indeterminate liquid drain channels communicably connected to the vertically extended interfaces so as to allow contaminants separated by the media to drain by gravity to a point outside the gas stream being treated. The fibers of all three layers advantageously can be of glass with the diameter of the fibers of the upstream layer 21 of filter medium material being in the range of approximately .7 micron to 3.0 microns, the diameter of the fibers of the intermediate layer 22 being within a range of approximately 10 microns to approximately 50 microns and the diameter of the fibers of downstream layer 23 being in the range of approximately .2 micron to approximately 1.0 micron.

With the aforedescribed apparatus for separating solid and liquid contaminants from a dirty gas stream, it now is possible to eliminate oil mist, smokes and fumes caused by such operations as wet-machining, food processing and the like at efficiencies equal to electrostatic precipitators but at less than half the cost. In fact, such large air handling capacities and high cleaning efficiencies can be obtained with the present invention, that recirculation of clean air in the the work area can be accomplished at comparatively low cost with provisions for ready filter cartridge change.

The invention claimed is:

Apparatus for separating solid and liquid contaminants from a dirty gas stream comprising:
  (a) a housing having a dirty gas inlet and a clean gas outlet;
  (b) fan means to move the dirty gas stream through said housing;
  (c) a filter cartridge including upstream and downstream layers of flexible porous fibrous filter medium positioned in spaced vertical relationship with respect to each other with the facing side of one of said layers of filter medium being of fuzzy, stable nature to provide a vertically extending point contact interface therebetween;
  (d) said facing layers of filter medium being arranged as a unit in a vertically extending pleat having layered side walls;
  (e) a plurality of spaced vertical seams extending along said layered side walls of said pleat to form a plurality of vertically extending layered pockets having mouth portions in said pleat;
  (f) an apertured support member cooperable with the mouth portions of said vertically extending pleat to maintain said mouth portions in open position to receive a dirty gas stream to be treated; and,
  (g) spaced support rails in said housing adapted to receive said support member whereby said filter cartridge is removably disposed intermediate said gas inlet and gas outlet of said housing;
  (h) one of said layers of said filter medium comprising a bed of low density fibrous material having spaced inlet and outlet faces with interspersed fibers therebetween of a diameter greater than the diameter of the fibers of the other layer and sufficient in size to form a maze of indeterminate drain channels communicably connected to said vertically extending interface of said layers whereby liquid contaminants separated by said layered filter medium pockets drain through said point contacts at said interface by gravity to a point outside the gas stream being treated.

References Cited by the Examiner

UNITED STATES PATENTS

| | | | |
|---|---|---|---|
| 2,607,436 | 8/52 | Martin | 55—484 |
| 2,771,153 | 11/56 | Hennig | 55—484 |
| 2,853,154 | 9/58 | Rivers | 55—341 |
| 2,959,247 | 11/60 | Sare et al. | 55—382 |
| 2,964,127 | 12/60 | Korn | 55—487 |
| 3,057,138 | 10/62 | Huxster | 55—486 |
| 3,124,441 | 3/64 | Rivers | 55—500 |

FOREIGN PATENTS 800,195  8/58  Great Britain.

HARRY B. THORNTON, *Primary Examiner.*

HERBERT L. MARTIN, *Examiner.*

UNITED STATES PATENT OFFICE
CERTIFICATE OF CORRECTION

Patent No. 3,208,205  September 28, 1965

John D. Harms et al.

It is hereby certified that error appears in the above numbered patent requiring correction and that the said Letters Patent should read as corrected below.

Column 4, line 15, for "spaced" read -- faced --.

Signed and sealed this 1st day of April 1969.

(SEAL)
Attest:

Edward M. Fletcher, Jr.
Attesting Officer

EDWARD J. BRENNER
Commissioner of Patents